United States Patent
Anzai et al.

(10) Patent No.: US 9,581,244 B2
(45) Date of Patent: Feb. 28, 2017

(54) SEAL BEAD STRUCTURE OF GASKET

(75) Inventors: Takanori Anzai, Makinohara (JP); Masaru Ito, Makinohara (JP); Shinya Nakaoka, Makinohara (JP); Isao Tanji, Makinohara (JP)

(73) Assignee: NOK Corporation (JP)

( * ) Notice: Subject to any disclaimer, the term of this patent is extended or adjusted under 35 U.S.C. 154(b) by 0 days.

(21) Appl. No.: 13/985,461

(22) PCT Filed: Jan. 19, 2012

(86) PCT No.: PCT/JP2012/051031
§ 371 (c)(1),
(2), (4) Date: Aug. 14, 2013

(87) PCT Pub. No.: WO2012/120924
PCT Pub. Date: Sep. 13, 2012

(65) Prior Publication Data
US 2014/0008877 A1 Jan. 9, 2014

(30) Foreign Application Priority Data
Mar. 8, 2011 (JP) .................................. 2011-050157

(51) Int. Cl.
*F02F 11/00* (2006.01)
*F16J 15/02* (2006.01)
*F16J 15/08* (2006.01)

(52) U.S. Cl.
CPC .......... *F16J 15/02* (2013.01); *F16J 15/0818* (2013.01)

(58) Field of Classification Search
USPC ............... 277/594, 595, 598, 600, 601, 644
See application file for complete search history.

(56) References Cited

U.S. PATENT DOCUMENTS 4,896,891 A 1/1990 Udagawa
5,725,222 A * 3/1998 Kobayashi .................. 277/594
(Continued)

FOREIGN PATENT DOCUMENTS

CN 1036865 C 12/1997
CN 101529138 A 9/2009
(Continued)

OTHER PUBLICATIONS

International Search Report for PCT/JP2012/051031 (in English and Japanese), mailed Mar. 19, 2012; ISA/JP.

*Primary Examiner* — Kristina Fulton
*Assistant Examiner* — Eugene G Byrd
(74) *Attorney, Agent, or Firm* — Harness, Dickey & Pierce, P.L.C.

(57) ABSTRACT

Provided is a seal bead structure of a gasket capable of reducing the reactive force generated in a common bead portion provided between multiple through-holes and thereby capable of achieving a stable sealing function by means of aligning the compression property over the entire bead. In order to achieve this, two through-holes are provided in a row in the flat portion of a metal gasket, with one seal bead provided on the edge of one through-hole, the other seal bead provided on the edge of the other through-hole, and a common bead portion for the both seal beads provided in the intermediate position between the both through-holes, the common bead portion having a two-stage half bead shape in which the half beads are formed on two stage in the same direction.

2 Claims, 7 Drawing Sheets

(56) References Cited

U.S. PATENT DOCUMENTS

| | | | |
|---|---|---|---|
| 5,895,055 A * | 4/1999 | Udagawa | 277/595 |
| 5,924,700 A * | 7/1999 | Kobayashi | 277/595 |
| 6,168,166 B1 * | 1/2001 | Akimoto | 277/594 |
| 6,431,554 B1 * | 8/2002 | Miyamoto et al. | 277/593 |
| 6,457,724 B2 * | 10/2002 | Ogaeri et al. | 277/595 |
| 6,974,137 B2 * | 12/2005 | Beutter et al. | 277/598 |
| 7,000,924 B2 * | 2/2006 | Hohe et al. | 277/593 |
| 7,137,631 B2 * | 11/2006 | Udagawa et al. | 277/594 |
| 7,213,813 B2 * | 5/2007 | Sueda | 277/594 |
| 7,293,779 B2 * | 11/2007 | Inciong et al. | 277/594 |
| 7,665,741 B2 * | 2/2010 | Imai | 277/592 |
| 7,793,943 B2 * | 9/2010 | Sueda | 277/594 |
| 8,100,409 B2 * | 1/2012 | Schmitz | 277/593 |
| 2003/0015845 A1 * | 1/2003 | Miyaoh | 277/594 |
| 2005/0151327 A1 * | 7/2005 | Udagawa et al. | 277/594 |
| 2006/0097460 A1 * | 5/2006 | Udagawa et al. | 277/595 |
| 2006/0145427 A1 * | 7/2006 | Sueda | 277/594 |
| 2009/0001672 A1 | 1/2009 | Takahashi et al. | |

FOREIGN PATENT DOCUMENTS

| | | |
|---|---|---|
| DE | 3915434 A1 | 11/1989 |
| DE | 102005013346 A1 | 9/2006 |
| DE | 102008013778 A1 | 9/2008 |
| GB | 2218755 A | 11/1989 |
| JP | H01168059 U | 11/1989 |
| JP | H04107575 U | 9/1992 |
| JP | 08121596 A | 5/1996 |
| JP | 09229195 A | 9/1997 |
| JP | 2004052956 A | 2/2004 |
| JP | 2008157377 A | 7/2008 |
| JP | 2008223952 A | 9/2008 |

* cited by examiner

SEAL BEAD STRUCTURE OF GASKET

CROSS-REFERENCE TO RELATED APPLICATIONS

This application is a U.S. National Stage Application of International Application No. PCT/JP2012/051031 filed on Jan. 19, 2012, and published in Japanese as WO 2012/120924 on Sep. 13, 2012. This application claims priority to Japanese Application No. 2011-050157 filed on Mar. 8, 2011. The disclosures of the above applications are incorporated herein by reference.

BACKGROUND OF THE INVENTION

Field of the Invention

The present invention relates to a gasket which is one kind of sealing devices, and more particularly to a seal bead structure of a gasket in which a through hole is provided in a flat surface portion of a metal gasket, and a seal bead is provided in a peripheral edge portion of the through hole. The gasket according to the present invention is used, for example, in a field relevant to an automobile, or is used in the other fields.

Description of the Conventional Art

Conventionally, for example, as a gasket which is used in a water pump relevant to the automobile, there has been known a gasket in which a plurality of through holes penetrating in a thickness direction are provided in a flat surface portion of a tabular metal gasket, and a seal bead is three-dimensionally molded in a peripheral edge portion of each of the through holes. In the gasket mentioned above, in the case that it is necessary to seal between the adjacent through holes, and it is impossible to set full beads in parallel since a distance (a seal width) between the through holes is narrow, the seal between the through holes 61 and 71 is carried out by employing the following structure.

(1) A structure in which two full beads 62 and 72 are connected as one full bead 82, as shown in FIG. 3; or (2) a structure in which two half beads 63 and 73 are connected as one trapezoidal bead 83 (FIG. 4) or one full bead (FIG. 5) 84, as shown in FIG. 4 or 5.

In FIGS. 3 to 5, FIGS. 3A, 4A and 5A are plan views of the metal gasket in which a plurality of through holes 61 and 71 are provided in a flat portion 51 so as to pass through in a gasket thickness direction (a direction which is orthogonal to a paper surface in the drawings), and each of the beads is provided in a peripheral edge portion of each of the through holes 61 and 71. FIGS. 3B, 4B and 5B show schematic cross sectional views along a line C-C, a line D-D and a line E-E in the respective FIGS. 3A, 4A and 5A.

In features of three kinds of seal beads, a sealing performance (pressure) has the following relationship:

full bead>trapezoidal bead>half bead (FIG. 6), and a bead compression property and followability have the following relationship:

half bead>trapezoidal bead>full bead (FIG. 7).

An appropriate bead is selectively used in correspondence to a used requirement (a required pressure or a housing rigidity). In FIGS. 6 and 7, solid lines on the graphs indicate the full bead, single-dot chain lines indicate the trapezoidal bead, and dotted lines indicate the half bead, respectively.

Among them, in the case that a working pressure range is high, a portion between the through holes 61 and 71 is sealed by the structure (1) mentioned above, however, since the bead rigidity becomes extremely higher in a combined portion (a peak portion) which connects two full beads 62 and 72 to one full bead 82, a surface pressure of its peripheral portion is lowered, and there is fear that the sealing performance is lowered.

As a countermeasure thereof, in a seal bead structure described in Japanese Unexamined Patent Publication No. 2008-157377, a flat portion is provided by forming a combined portion 85 as a three-point connection in place of a pin point structure, and a surface pressure concentration is prevented in the combined portion 85 by setting a crossing angle to 25 to 45 degrees. As a result, uniformization of the bead surface pressure is achieved between the portion constituted by one bead and the portion constituted by two beads.

In the case that a bolt pitch is long, in the case that a thickness of an opponent housing is small, and in the case that the through holes 61 and 71 which are away from a bolt are sealed, the opponent housing is significantly deformed since the full beads 62 and 72 have greater generated reaction force on the assumption that an amount of compression is fixed as shown in FIG. 7. As a result, it is impossible to sufficiently compress the gasket, and the full beads 62 and 72 can not be applied.

Therefore, the case mentioned above is dealt with the structure (2) in which the half beads 63 and 73 having good compression property are combined with the trapezoidal bead 83 or the full bead 84. However, since the reaction force is not generated in the half beads 63 and 73 until the half beads 63 and 73 are compressed to about 50% of the bead height while the reaction force is generated in the trapezoidal bead 83 and the full bead 84 just after starting the compression, it is necessary to set a compression restoring property of the trapezoidal bead 83 and the full bead 84 so that the half beads 63 and 73 can be compressed 50% or more in the vicinity of the combined portion (the peak portion) 85. Accordingly, the reaction force is specifically made smaller by setting the bead width of the trapezoidal bead 83 or the full bead 84 to be wider, however, this structure can not deal with the case that the seal width between the through holes 61 and 71 is narrow.

As the other prior arts in relation to the present invention, there are seal bead structures which are described in Japanese Unexamined Patent Publication No. 8-121596 and Japanese Unexamined Patent Publication No. 9-229195, however, these seal bead structures do not form a common bead portion provided between a plurality of through holes in a special shape.

SUMMARY OF THE INVENTION

Problem to be Solved by the Invention

The present invention is made by taking the above points into consideration, and an object of the present invention is to provide a seal bead structure which can reduce a reaction force generated in a common bead portion provided between a plurality of through holes, and can accordingly achieve a stable sealing function by aligning a compression property over a whole bead.

Means for Solving the Problem

In order to achieve the object mentioned above, according to a first aspect of the present invention, there is provided a seal bead structure of a gasket comprising:

one through hole;

the other through hole;

the one through hole and the other through hole being provided side by side in a flat surface portion of a metal gasket;

one seal bead provided in a peripheral edge portion of the one through hole;

the other seal bead provided in a peripheral edge portion of the other through hole; and a common bead portion for the both seal beads, the common bead portion being provided at an intermediate position between the both through holes, wherein the common bead portion is formed as a two-stage half bead shape obtained by forming two stages of half beads in the same direction.

Further, according to a second aspect of the present invention, there is provided the seal bead structure of the gasket described in the first aspect mentioned above, wherein the two-stage half bead shape of the common bead portion comprises:

one half bead portion which is connected from the one seal bead and is constructed by one inclined surface portion and one leading end flat portion;

the other half bead portion which is connected from the other seal bead and is constructed by the other inclined surface portion and the other leading end flat portion; and a connection portion which connects the both half bead portions and is formed as a planate shape, and wherein a three-dimensional shape is formed by five surfaces of the one inclined surface portion, the one leading end flat portion, the other inclined surface portion, the other leading end flat portion and the planate connection portion, and the three-dimensional shape is formed continuously along a longitudinal direction of an intermediate position between the both through holes.

In the seal bead structure according to the present invention which is provided with the structure mentioned above, since the common bead portion is formed as the two-stage half bead shape obtained by forming two stages of half beads in the same direction, a compression property achieved here is not the same property as the trapezoidal bead and the full bead, but the same property as the half bead. Accordingly, it is possible to align the compression property over the whole bead, by setting the seal bead provided in the peripheral edge portion of each of the through holes to the half bead, and forming the common bead portion as the two-stage half bead shape.

The two-stage half bead shape mentioned above is provided, for example, with the one half bead portion which is connected from the one bead and is constructed by the one inclined surface portion and the one leading end flat portion, the other half bead portion which is connected from the other bead and is constructed by the other inclined surface portion and the other leading end flat portion, and the planate connection portion which connects both the half bead portions. In this case, the three-dimensional shape is formed by five surfaces of the one inclined surface portion, the one leading end flat portion, the other inclined surface portion, the other leading end flat portion and the planate connection portion, and the three-dimensional shape constructed by five surfaces is formed continuously along the longitudinal direction of the intermediate position between both the through holes.

Further, in the case that the planate connection portion is set to a reference surface, the one half bead portion is continuously provided in one in a thickness direction of the reference surface, and the other half bead portion is continuously provided in the other in the thickness direction of the reference surface. Therefore, the one half bead portion and the other half bead portion are provided in opposite directions in the thickness direction of the reference surface to each other.

Effect of the Invention

The present invention achieves the following effects.

In other words, in the seal bead structure according to the present invention, as mentioned above, since the common bead portion is formed as the two-stage half bead shape obtained by forming two stages of half beads in the same direction, the compression property achieved here is the same property as that of the half bead. Accordingly, it is possible to align the compression property over the whole bead by setting the seal bead provided in the peripheral edge portion of each of the through holes to the half bead and forming the common bead portion as the two-stage half bead shape. As a result, it is possible to provide the bead structure of the gasket which can achieve the stable sealing function. The seal width which is necessary for setting the two-stage half bead shape is significantly smaller than the seal width which is necessary for setting two full bead in line.

BRIEF EXPLANATION OF THE DRAWINGS

FIGS. 1A and 1B are views showing a seal bead structure of a gasket according to an embodiment of the present invention, in which FIG. 1A is a plan view of the gasket, and FIG. 1B is a schematic cross sectional view of a state in which the gasket is cut by a line F-F;

FIGS. 2A and 2B are views showing a seal bead structure of a gasket according to the other embodiment of the present invention, in which FIG. 2A is a plan view of the gasket, and FIG. 2B is a schematic cross sectional view of a state in which the gasket is cut by a line G-G;

FIGS. 3A and 3B are views showing a seal bead structure of a gasket according to a prior art, in which FIG. 3A is a plan view of the gasket, and FIG. 3B is a schematic cross sectional view of a state in which the gasket is cut by a line C-C;

FIGS. 4A and 4B are views showing a seal bead structure of a gasket according to the other prior art, in which FIG. 4A is a plan view of the gasket, and FIG. 4B is a schematic cross sectional view of a state in which the gasket is cut by a line D-D;

FIGS. 5A and 5B are views showing a seal bead structure of a gasket according to the other prior art, in which FIG. 5A is a plan view of the gasket, and FIG. 5B is a schematic cross sectional view of a state in which the gasket is cut by a line E-E;

DETAILED DESCRIPTION OF PREFERRED EMBODIMENTS

The present invention includes the following modes.

(1) In the case that it is necessary to seal between adjacent oil passages (water passages), and the half beads are used (a half bead function is necessary), the beads are not connected by a trapezoidal bead or a full bead, but connected by a two-stage half bead (a structure obtained by forming two stages of half beads in the same direction).

(2) Since the beads between the oil passages are obtained by forming two stages of half beads in the same direction as mentioned in the item (1), the bead connection portion in the case of connecting by the full bead is not provided, and the trapezoidal bead is not employed, so that the bead property between the oil passages can be set to the same property (compression property) as that of the half bead in the other portions.

(3) There has been known a shape which is provided with plural stages of half beads, in the same manner as the shape according to the present invention, in the patent document 2 or the patent document 3 mentioned above. However, the patent documents describe that it is possible to enhance the following property at a degree that the half bead height becomes higher than the conventional one by setting the plural stages of half beads, and describe that since the stress is dispersed in correspondence to the stage number of the half beads by setting the plural stages of half beads, as is different from the case that the same height is obtained only by one stage of half bead, a plastic deformation becomes smaller as a whole than the one-stage case, and it is possible to enhance the following property. Further, the patent documents describe that there is provided the gasket which has the excellent sealing performance (following property) between the bolts while preventing the bolt slack and breakage by setting one stage of half bead in the vicinity of the bolts and setting two stages of half beads as coming close to the portion between the bolts. Therefore, in spite of the similar shapes, the present invention designates the connecting way for overcoming a weak point of the bead connection portion which is generated for sealing the adjacent oil passages, and has a different object from that of the inventions described in the patent documents.

EMBODIMENTS

Next, a description will be given of embodiments according to the present invention with reference to the accompanying drawings.

Figure 1A:
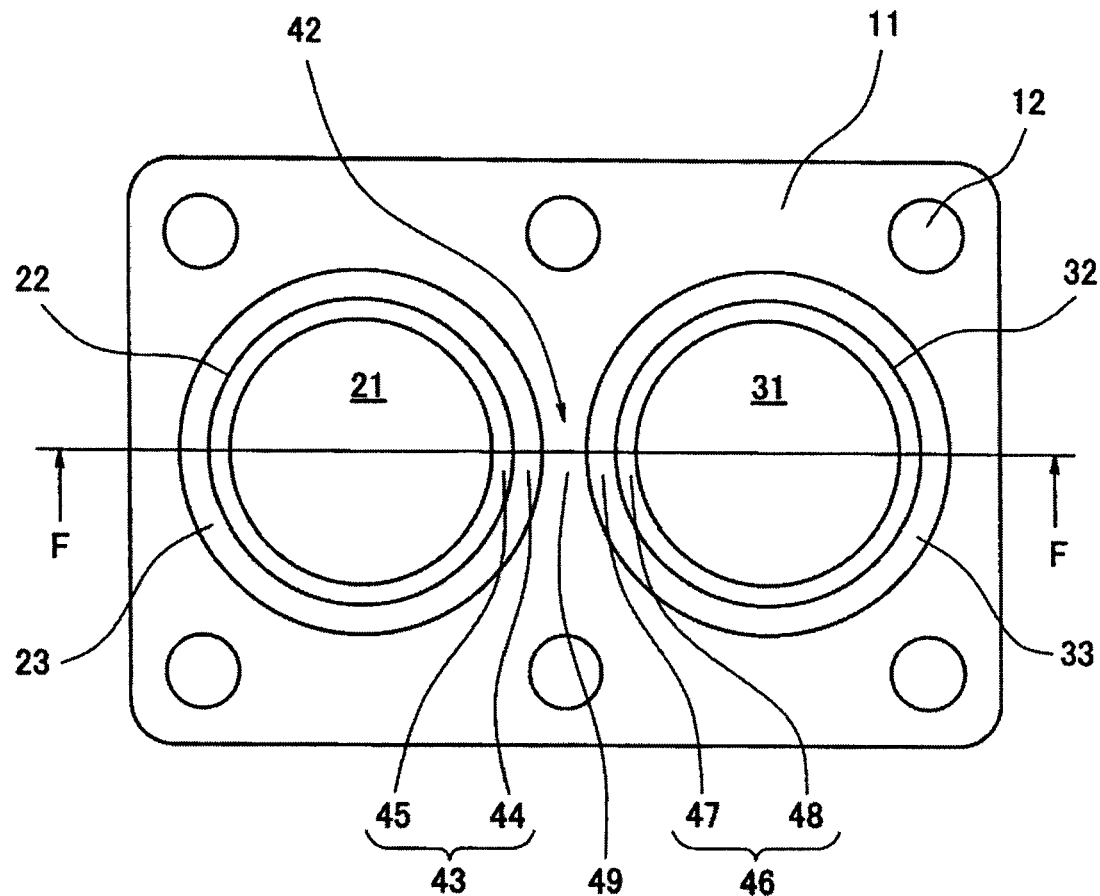
Figure 1B:
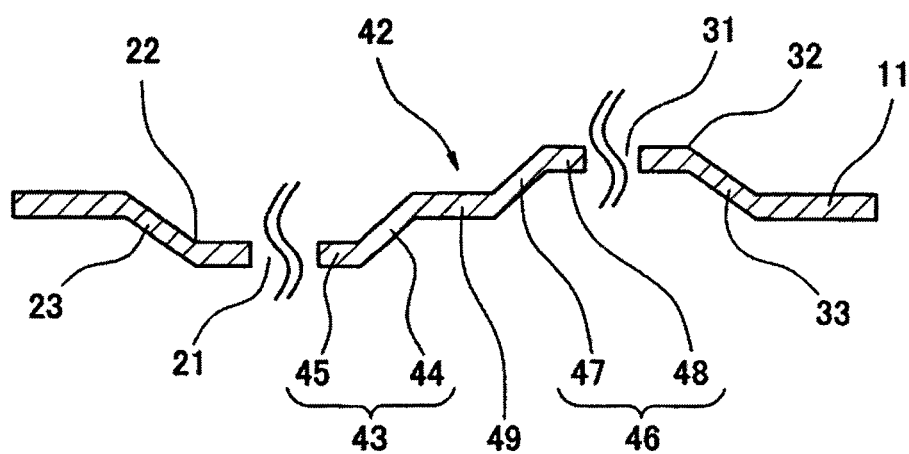

FIGS. 1A and 1B show a seal bead structure of a gasket according to an embodiment of the present invention. In other words, FIG. 1A shows a plan view of the gasket, and FIG. 1B shows a cross sectional view of the gasket, that is, a schematic cross sectional view along a line F-F in FIG. 1A, respectively.

The gasket according to the embodiment is constructed, for example, by a gasket which is used as a watertight seal in a water pump relevant to an automobile. As shown in FIG. 1A, the gasket is provided with a first through hole 21 serving as one through hole (a flow passage hole of an oil passage or a water passage) and a second through hole 31 serving as the other through hole side by side in a flat surface portion 11 of a tabular metal gasket having a predetermined flat surface shape (an approximately rectangular shape in the drawing), is provided with a first seal bead 22 constructed by a half bead serving as one seal bead in a peripheral edge portion of the first through hole 21, is provided with a second seal bead 32 constructed by the half bead serving as the other seal bead in a peripheral edge portion of the second through hole 31, and is provided with a common bead portion 42 of both the seal beads 22 and 32 at an intermediate position between both the through holes 21 and 31.

Further, the common bead portion 42 mentioned above is formed as a two-stage half bead shape obtained by forming two stages of half beads in the same direction, as shown in FIG. 1B. Specifically, the common bead portion 42 is integrally provided with a first half bead portion 43 serving as one half bead portion which is connected with an unchanged cross sectional shape from the first bead 22, a second half bead portion 46 serving as the other half bead portion which is connected with an unchanged cross sectional shape from the second bead 32, and a planate connection portion 49 which connects both the half bead portions 43 and 46. The first half bead portion 43 is integrally provided with a first inclined surface portion 44 serving as one inclined surface portion, and a first leading end flat portion 45 serving as one leading end flat portion. The second half bead portion 46 is integrally provided with a second inclined surface portion 47 serving as the other inclined surface portion, and a second leading end flat portion 48 serving as the other leading end flat portion.

Further, since the planate connection portion 49 mentioned above is arranged on the same plane as the flat surface portion 11 and may act as a reference surface for a bead start, a description will be first given of the connection portion 49. The first inclined surface portion 44 of the first half bead portion 43 is integrally provided at a predetermined angle of incline from one end portion (a left end portion in FIG. 1B) in a width direction of the connection portion 49 toward one side (a lower side in FIG. 1B) in a gasket thickness direction, and the first leading end flat portion 45 which is formed as a flat shape and is approximately parallel to the connection portion 49 is integrally provided in a leading end of the first inclined surface portion 44. Further, the second inclined surface portion 47 of the second half bead portion 46 is integrally provided at a predetermined angle of incline from the other end portion (a right end portion in FIG. 1B) in the width direction of the connection portion 49 toward the other side (an upper side in FIG. 1B) in the gasket thickness direction, and the second leading end flat portion 48 which is formed as a flat shape and is approximately parallel to the connection portion 49 is integrally provided in a leading end of the second inclined surface portion 47. Accordingly, since the first half bead portion 43 is provided in one side in the thickness direction of the connection portion 49 to the flat surface portion 11 and the second half bead portion 46 is provided in the other side in the thickness direction of the connection portion 49 to the flat surface portion 11, the first half bead portion 43 and the second half bead portion 46 are provided in the opposite sides in the thickness direction to each other.

Further, in the structure mentioned above, the common bead portion 42 is formed as a three-dimensional shape having five surfaces which are constructed by the first inclined surface portion 44, the first leading end flat portion 45, the second inclined surface portion 47, the second leading end flat portion 48 and the connection portion 49, however, the three-dimensional shape constructed by five surfaces is formed along a longitudinal direction of an intermediate position between both the through holes 21 and 31 without being interrupted in midstream, and particularly the intermediate connection portion 49 is also formed along the longitudinal direction of the intermediate position between both the through holes 21 and 31 without being interrupted in midstream. Reference numeral 12 denotes a bolt hole for inserting an assembling bolt thereto.

In the seal bead structure of the structure mentioned above, since the common bead portion 42 is formed as the two-stage half bead shape obtained by forming two stages of half beads in the same direction, a compression property achieved by the common bead portion is set to the same property as that of the first and second seal beads 22 and 32 which are constructed by the half beads. Accordingly, it is possible to align the compression property over a whole of the beads, and it is possible to provide the gasket bead structure which can achieve a stable sealing function.

Further, a seal width between the through holes 21 and 31 which is necessary for the provision of the two-stage half bead shape is extremely smaller than a seal width which is necessary for the provision of two full beads. Therefore, the bead structure is suitable for being utilized under a condition that the seal width set between the through holes 21 and 31 is narrow.

In the embodiment mentioned above, the width and the angle of incline of the first inclined surface portion 44 in the first half bead portion 43 forming the two-stage half bead shape are set to be identical to the width and the angle of incline of the inclined surface portion 23 of the first seal bead 22 which surrounds the first though hole 21, however, they may be set to be somewhat different. In other words, the width of the first inclined surface portion 44 may be set to be smaller than the width of the inclined surface portion 23, and the angle of incline of the first inclined surface portion 44 may be set to be larger than the angle of incline of the inclined surface portion 23. On the other hand, the width of the first inclined surface portion 44 may be set to be larger than the width of the inclined surface portion 23, and the angle of incline of the first inclined surface portion 44 may be set to be smaller than the angle of incline of the inclined surface portion 23. Further, in the same manner, the width and the angle of incline of the second inclined surface portion 47 in the second half bead portion 46 forming the two-stage half bead shape are set to be identical to the width and the angle of incline of the inclined surface portion 33 of the second seal bead 32 which surrounds the second through hole 31, however, they may be set to be somewhat different. In other words, the width of the second inclined surface portion 47 may be set to be smaller than the width of the inclined surface portion 33, and the angle of incline of the second inclined surface portion 47 may be set to be larger than the angle of incline of the inclined surface portion 33. On the other hand, the width of the second inclined surface portion 47 may be set to be larger than the width of the inclined surface portion 33, and the angle of incline of the second inclined surface portion 47 may be set to be smaller than the angle of incline of the inclined surface portion 33.

Figure 2A:
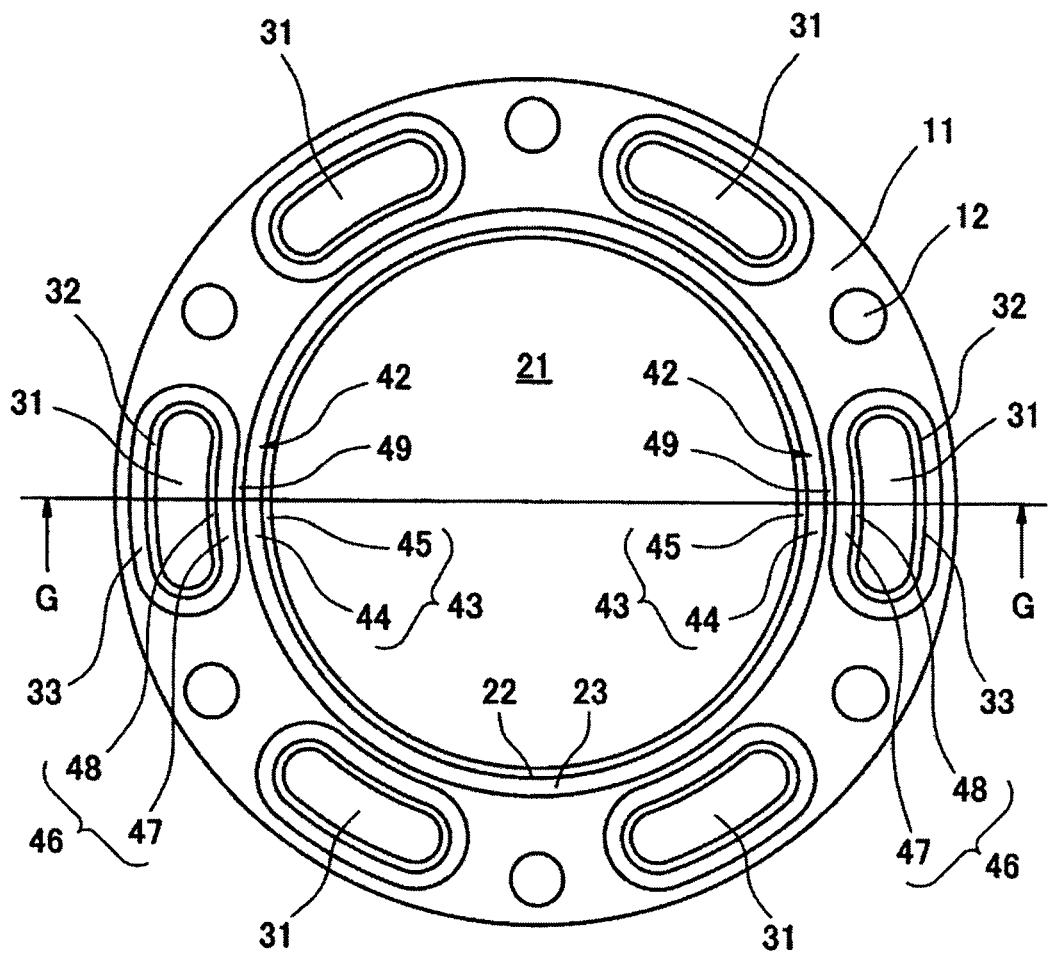
Figure 2B:
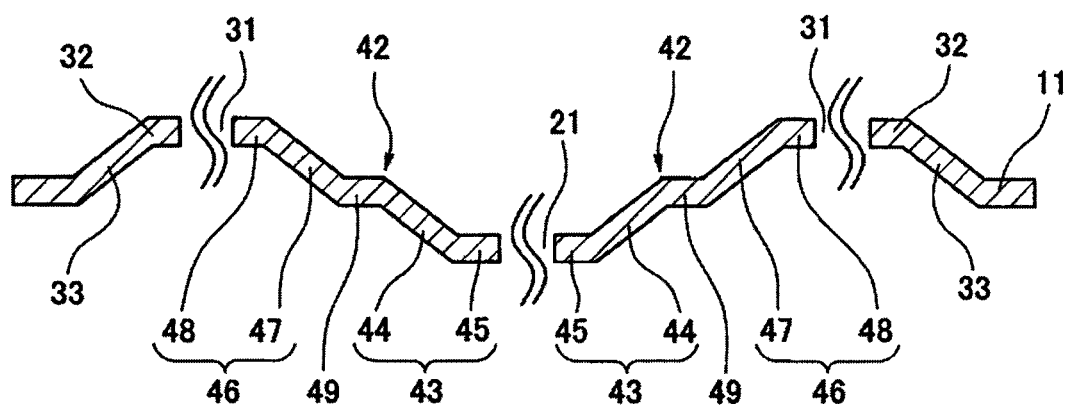
Figure 3A:
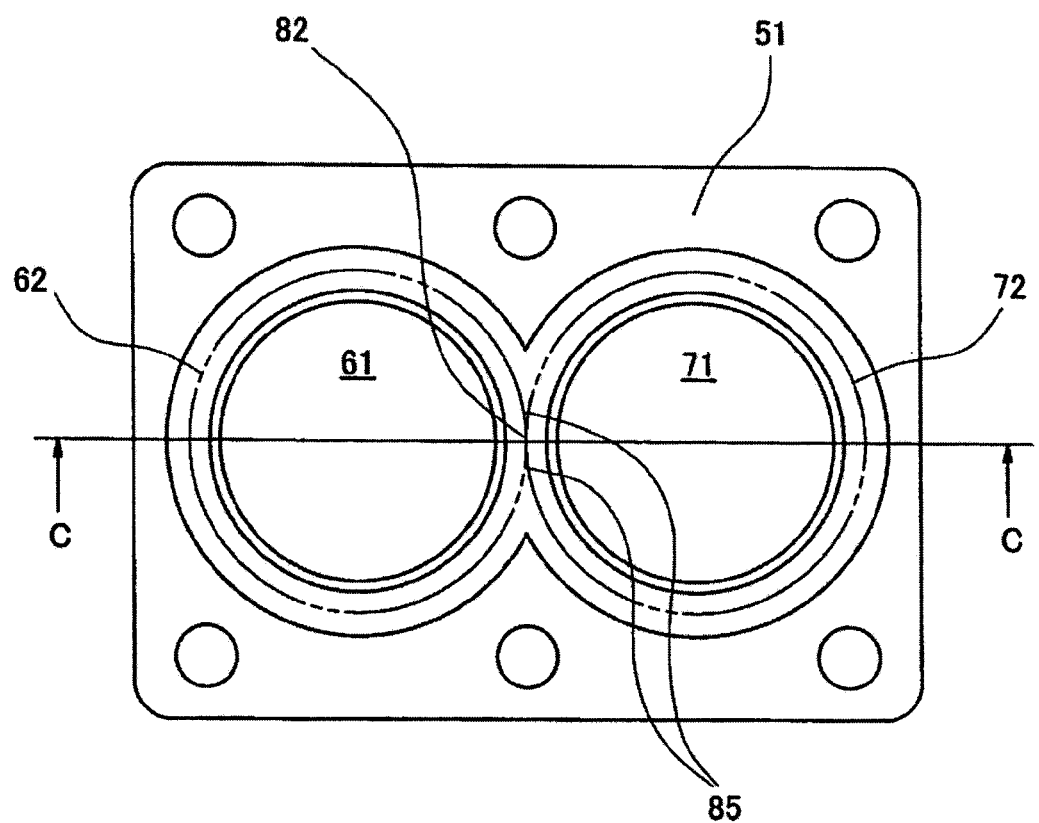
Figure 3B:
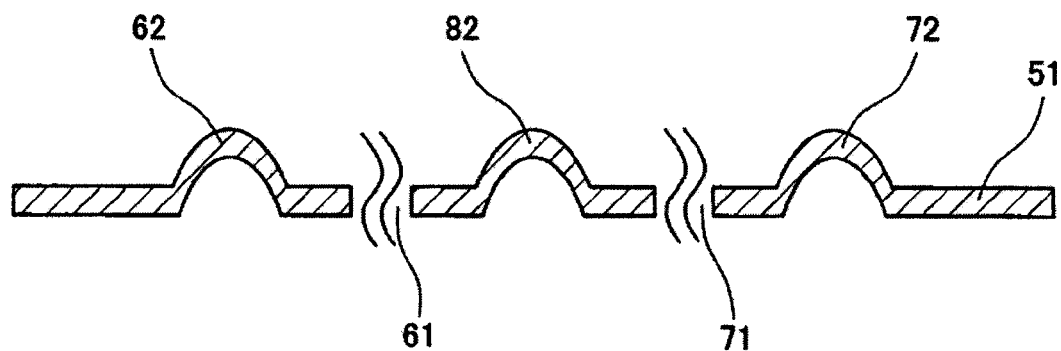
Figure 4A:
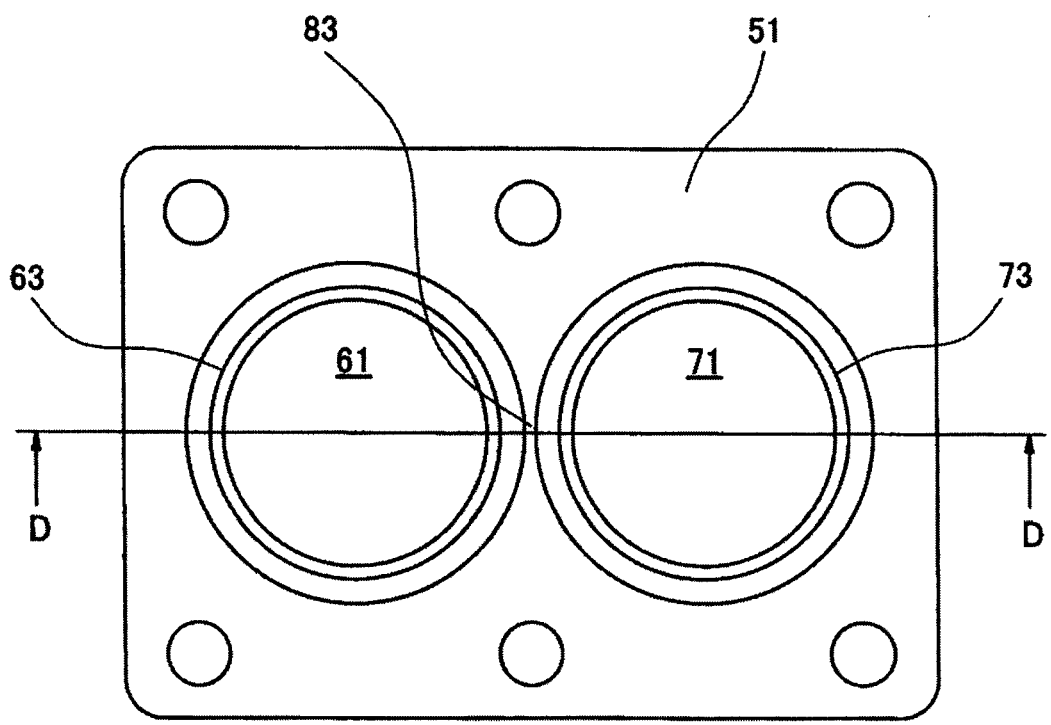
Figure 4B:
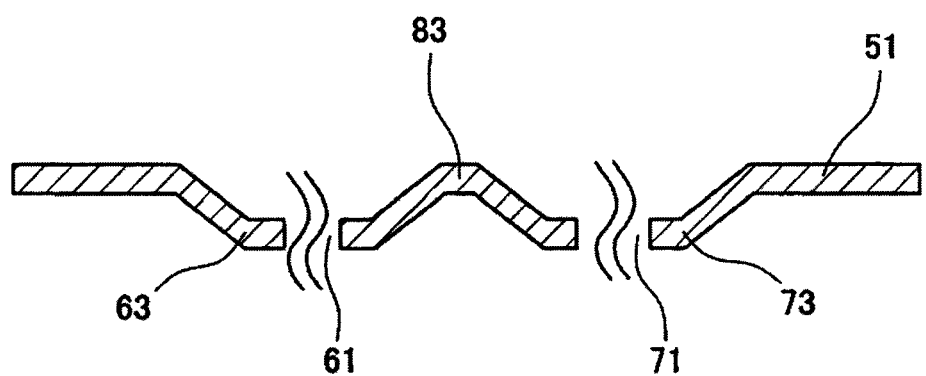
Figure 5A:
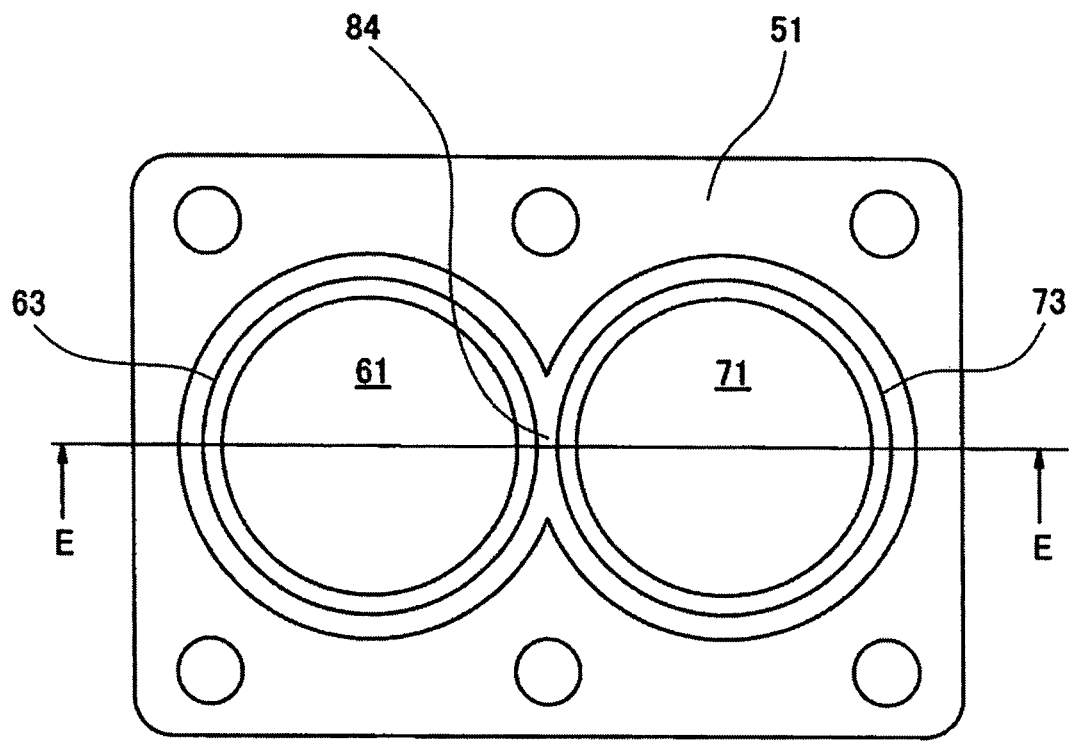
Figure 5B:
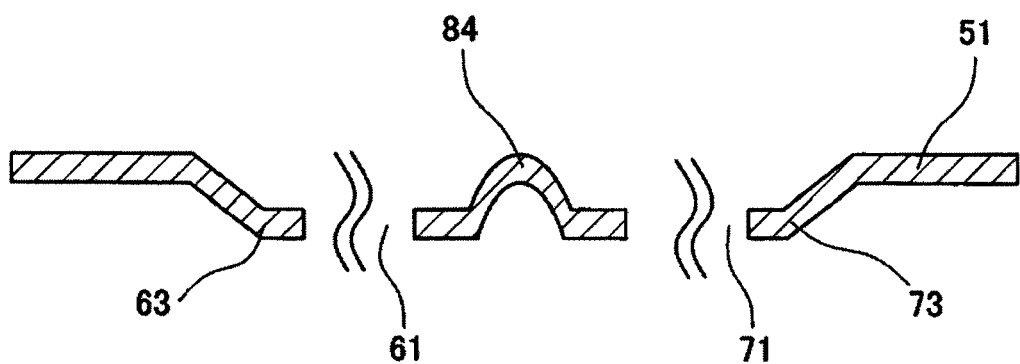
Figure 6:
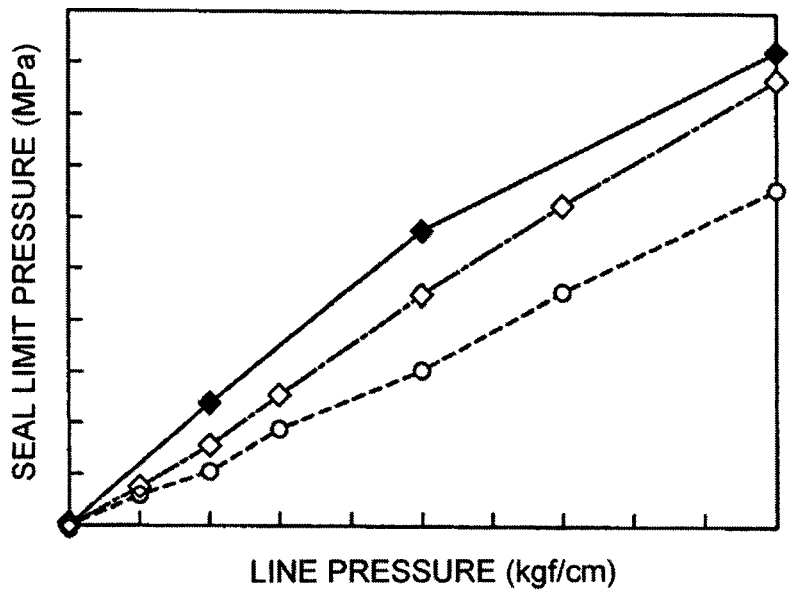
FIG. 6 is a graph showing a line pressure sealing performance of each of beads.
Figure 7:
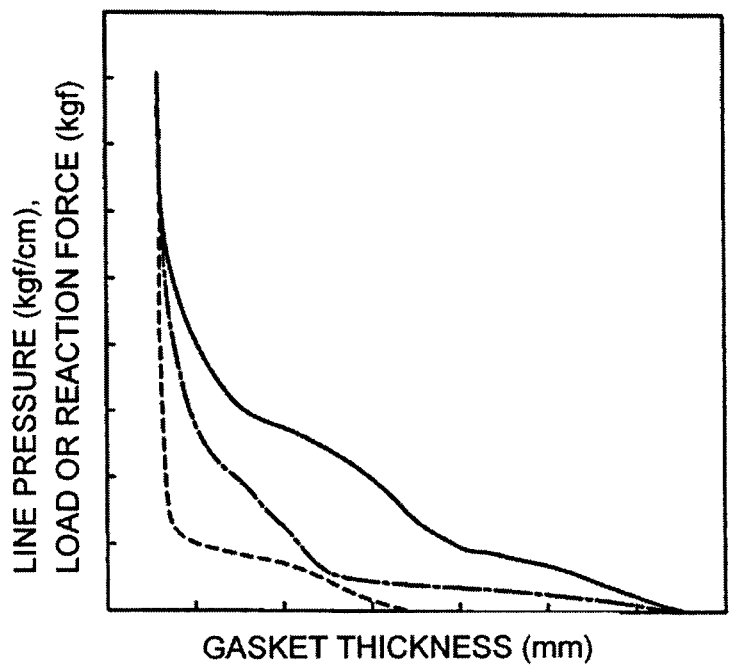
FIG. 7 is a graph showing a compression restoring property of each of the beads.
Figure 8:
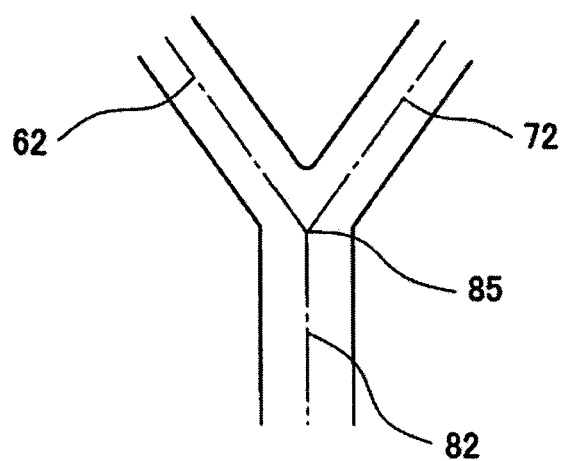
FIG. 8 is an enlarged view of a substantial part in FIG. 3A.

Further, in the embodiment mentioned above, the opening shapes (the flat surface shapes) of the first and second through holes 21 and 31 are set to be approximately the same shape and the same magnitude with each other, however, the present invention is not limited to this. For example, in the other embodiment shown in FIG. 2, a plurality of (in the drawing, six) comparatively small second through holes 31 are provided at equal distances around a comparatively large first through hole 21, and the opening shapes, the arrangements and the numbers of the through holes 21 and 31 may be set to these. In this case, a common bead portion 42 constructed by a two-stage half bead shape is provided between the first through hole 21 and each of the second through holes 31.

What is claimed is:

1. A seal bead structure of a gasket comprising:
   a first through hole;
   a second through hole;
   the first through hole and the second through hole being provided side by side with a spaced apart relationship from each other in a flat surface portion of a metal gasket;
   a first seal bead extending along a peripheral edge of said first through hole;
   a second seal bead extending along a peripheral edge of said second through hole; and
   a common bead portion of said first and second seal beads, the common bead portion being provided at an intermediate position between said first and second through holes,
   wherein said common bead portion has a two-stage half bead shape with two stages of half beads in the same direction, the two-stage half bead shape having a three-stage flat portion configuration including:
      a planate connection portion having first and second ends in a width direction thereof;
      a first inclined portion integrally provided at a first predetermined angle of incline from the first end of the planate connection portion;
      a first leading end flat portion integrally provided at a first leading end of the first inclined portion opposite to the planate connection portion, the first leading end flat portion being substantially parallel to the planate connection portion and terminating at a free end forming a periphery of the first through hole;
      a second inclined portion integrally provided at a second predetermined angle of incline from the second end of the planate connection portion; and
      a second leading end flat portion integrally provided at a second leading end of the second inclined portion opposite to the planate connection portion, the second leading end flat portion being substantially parallel to the planate connection portion and terminating at a free end forming a periphery of the second through hole,
   wherein said planate connection portion is co-planar with said flat surface portion of said metal gasket, and
   wherein an entirety of the first inclined portion is separated from an entirety of the second inclined portion by the planate connection portion.

2. The seal bead structure of the gasket according to claim 1, wherein the two-stage half bead shape of said common bead portion is formed continuously along a longitudinal direction of the intermediate position between said first and second through holes.

* * * * *